United States Patent
Nasu et al.

(10) Patent No.: US 8,908,821 B2
(45) Date of Patent: Dec. 9, 2014

(54) CORE-STRUCTURE STORING METHOD

(75) Inventors: Hiroki Nasu, Kobe (JP); Yoshio Kitaoka, Kobe (JP); Akinori Takei, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1352 days.

(21) Appl. No.: 11/816,043

(22) PCT Filed: Feb. 8, 2006

(86) PCT No.: PCT/JP2006/302184
§ 371 (c)(1),
(2), (4) Date: Aug. 10, 2007

(87) PCT Pub. No.: WO2006/085560
PCT Pub. Date: Aug. 17, 2006

(65) Prior Publication Data
US 2009/0022258 A1    Jan. 22, 2009

(30) Foreign Application Priority Data
Feb. 10, 2005  (JP) ................. 2005-034846

(51) Int. Cl.
| | | |
|---|---|---|
| *G21C 19/00* | (2006.01) | |
| *G21C 19/20* | (2006.01) | |
| *G21C 19/19* | (2006.01) | |
| *G21C 19/32* | (2006.01) | |
| *G21F 5/00* | (2006.01) | |

(52) U.S. Cl.
CPC .............. *G21C 19/32* (2013.01); *G21C 19/207* (2013.01); *G21Y 2004/504* (2013.01); *G21C 19/19* (2013.01); *G21Y 2004/40* (2013.01); *G21Y 2002/501* (2013.01)
USPC ........... 376/272; 376/268; 376/264; 376/269; 376/270; 376/271; 250/506.1; 250/507.1

(58) Field of Classification Search
CPC ...... G21C 19/32; G21C 19/19; G21C 19/207; G21Y 2002/501; G21Y 2004/40; G21Y 2004/504
USPC ................. 376/272, 268, 264, 269, 270, 271; 250/506.1, 507.1
See application file for complete search history.

(56) References Cited

U.S. PATENT DOCUMENTS 4,704,801 A * 11/1987 Frizot et al. .................... 33/502
5,291,532 A *  3/1994 Townsend et al. ............ 376/269
(Continued)

FOREIGN PATENT DOCUMENTS

| JP | 11-084052 A | 3/1999 |
| JP | 1160176 A | 3/1999 |

(Continued)

OTHER PUBLICATIONS

Machine Translation of Otaki et al., JP 2004-069354.*

(Continued)

*Primary Examiner* — Frank J McGue
(74) *Attorney, Agent, or Firm* — Westerman, Hattori, Daniels & Adrian, LLP

(57) ABSTRACT

A storage container is carried into a nuclear-reactor containment, and then, the core structure is housed in the storage container. In this process, a bottom cover is carried to a storage-container body by using a moving device. The storage-container body and the bottom cover are positioned by adjusting the position of the bottom cover on the moving device while the bottom cover is supported by free bearings. The bottom cover is then attached to the storage-container body.

4 Claims, 15 Drawing Sheets

(56) References Cited

U.S. PATENT DOCUMENTS 6,198,787 B1 * 3/2001 Hasegawa et al. ............ 376/260
2002/0186806 A1 12/2002 Aoki et al.

FOREIGN PATENT DOCUMENTS

| | | | |
|---|---|---|---|
| JP | 11292492 | A | 10/1999 |
| JP | 2003215294 | A | 7/2003 |
| JP | 200469354 | A | 3/2004 |
| JP | 2004-264206 | A | 9/2004 |

OTHER PUBLICATIONS

Japanese Office Action dated Jun. 3, 2008 (mailing date), issued in corresponding Japanese Patent Application No. 2005-034846.

International Search Report of PCT/JP2006/302184, date of mailing Mar. 28, 2006.

Extended European Search Report dated Feb. 2, 2011, issued in corresponding European Patent Application No. 06713327.2.

* cited by examiner

B-B SECTION

ENLARGED VIEW
OF C PORTION

D-D SECTION

ENLARGED VIEW OF E PORTION

ENLARGED VIEW OF F PORTION

ENLARGED VIEW OF C PORTION

FIG.11
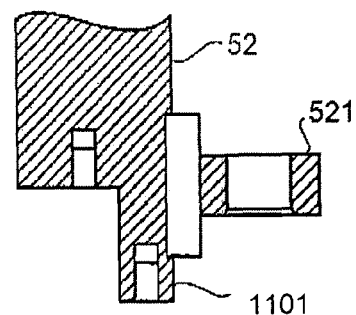
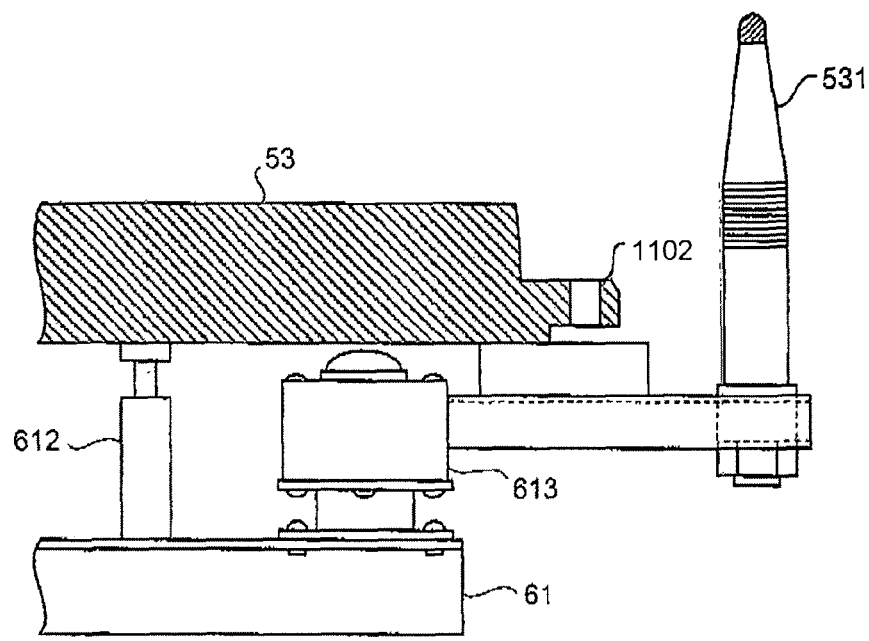
ENLARGED VIEW OF H PORTION

ENLARGED VIEW OF I PORTION

ENLARGED VIEW OF J PORTION

ENLARGED VIEW OF K PORTION

ENLARGED VIEW OF L PORTION

ENLARGED VIEW OF M PORTION

CORE-STRUCTURE STORING METHOD

TECHNICAL FIELD

The present invention relates to a core-structure storing method. More specifically, the present invention relates to a core-structure storing method capable of further reducing irradiation on an operator.

BACKGROUND ART

Generally, a core structure is stored in a storage container and then the storage container is carried into a nuclear-reactor storing housing. A typical storage container includes a storage-container upper cover, a storage-container body, and a storage-container bottom cover. Conventional core-structure storing methods are disclosed in Patent Documents 1 and 2.

The conventional core-structure storing method disclosed in Patent Document 1 includes a step of craning down a storage-container upper cover above a core structure, which is inserted into a nuclear-reactor vessel in a cavity, while water in the cavity is discharged; a step of attaching the storage-container upper cover to the core structure; a step of craning down the storage-container body so that the bottom of the storage-container body is closely in contact with the top surface of the nuclear-reactor vessel; a step of craning up the core structure with the storage-container upper cover so that the core structure with the storage-container upper cover is positioned inside the storage-container body; a step of attaching the storage-container upper cover to the storage-container body; a step of craning up the storage-container body to be positioned at a certain level; a step of positioning a storage-container bottom cover under the storage-container body; and a step of attaching the storage-container bottom cover to the storage-container body by craning up the storage-container bottom cover.

In the above conventional core-structure storing method, a moving device is set in the cavity and the storage-container bottom cover is placed on the moving device. The moving device is moved such that the storage container is positioned under the storage-container body.

Because the core structure, which is stored in the storage container is highly radioactive, there is a demand for means and measures capable of further reducing irradiation on an operator.

Patent Document 1: Japanese Patent Application Laid-open No. 2004-69354
Patent Document 2: Japanese Patent Application Laid-open No. 2003-215294

DISCLOSURE OF INVENTION

Problem to be Solved by the Invention

An object of the present invention is to provide a core-structure storing method capable of further reducing irradiation on an operator.

Means for Solving Problem

To achieve the object, according to an aspect of the present invention, there is provided a method of storing a core structure in a storage container after the storage container is carried into a reactor containment, including a step of carrying, by using a moving device which is movable, a bottom cover of the storage container to a body of the storage container; a step of positioning the body and the bottom cover by adjusting a position of the bottom cover on the moving device while the bottom cover is supported by a free bearing; and a step of attaching the position adjusted bottom cover to the body.

In the core-structure storing method, the storage-container body and the storage-container bottom cover are positioned by adjusting the position of the storage-container bottom cover on the moving device while the storage-container bottom cover is supported by the free bearing. In this method, because the storage-container bottom cover is supported by the free bearing, the storage-container bottom cover moves smoothly. Thus, the positioning of the storage-container bottom cover is performed smoothly. This advantageously facilitates the operation of the attachment of the storage-container bottom cover. Accordingly, the operation period is shortened, and this advantageously reduces irradiation on an operator. Furthermore, the camera monitoring of the positioning allows remote operations, and this advantageously reduces irradiation on an operator.

According to another aspect of the present invention, there is provided a method in which the step of positioning includes positioning the body and the bottom cover, by using a guide pin and a guide bush, in a way that the guide pin is engaged with and guided by the guide bush, the guide pin being attached to any one of the bottom cover and the body, and the guide bush being attached to any one of the bottom cover and the body, to which the guide pin is not attached.

According to the above core-structure storing method, the guide pins and the guide bushes are used for the positioning, and the storage-container body and the bottom cover are positioned in a way that the guide pins are engaged with and guided by the guide bushes, respectively. This advantageously facilitates the operation of attachment of the bottom cover. Specifically, the position of the bottom cover is adjusted smoothly, because the guide pins are engaged with the guide bushes while the bottom cover is supported by the free bearings. In this manner, the positioning is performed smoothly. This advantageously facilitates the operation of attachment of the bottom cover, and advantageously shortens the operation period, thus reducing irradiation of an operator.

According to another aspect of the present invention, there is provided a method in which the step of attaching includes attaching the bottom cover to the body tightly by pushing up the bottom cover on the moving device.

According to the above core-structure storing method, the bottom cover on the moving device is pushed up to be attached tightly to the storage-container body. This method advantageously facilitates the repositioning (reattachment) in the case of an operational error, or the like, compared to the case where the storage-container body that is heavier than the bottom cover is craned down and attached to the bottom cover. Furthermore, the clearance between the bottom cover and the storage-container body can be made smaller than that in a case where the bottom cover is craned up to be tightly attached to the storage-container body. This advantageously reduces the leakage of the radioactive substance from the storage container, thus reducing the irradiation of an operator. The bottom cover is pushed up by the jacks or an alternative lifting-up unit.

According to another aspect of the present invention, there is provided a method in which the step of carrying includes fixing the bottom cover onto the moving device, and the step of positioning includes releasing the fixing of the bottom cover, so that the bottom cover is supported by the free bearing.

According to the above core-structure storing method, the bottom cover is prevented from moving on the free beatings while being carried because the bottom cover is fixed on the moving device. This advantageously prevents an accident during the transfer of the bottom cover.

Effect of the Invention

In the core-structure storing method according to the present invention, a storage-container body and a storage-container bottom cover are positioned by adjusting the position of the storage-container bottom cover on a moving device while the storage-container bottom cover is supported by free bearings. This method facilitates the operation of the attachment of the storage-container bottom cover, so that the operation period is shortened. This advantageously inhibits an operator from being irradiated.

BRIEF DESCRIPTION OF DRAWINGS

FIG. 11 is still another explanatory diagram for explaining the core-structure storing method.

EXPLANATIONS OF LETTERS OR NUMERALS

Figure 1:
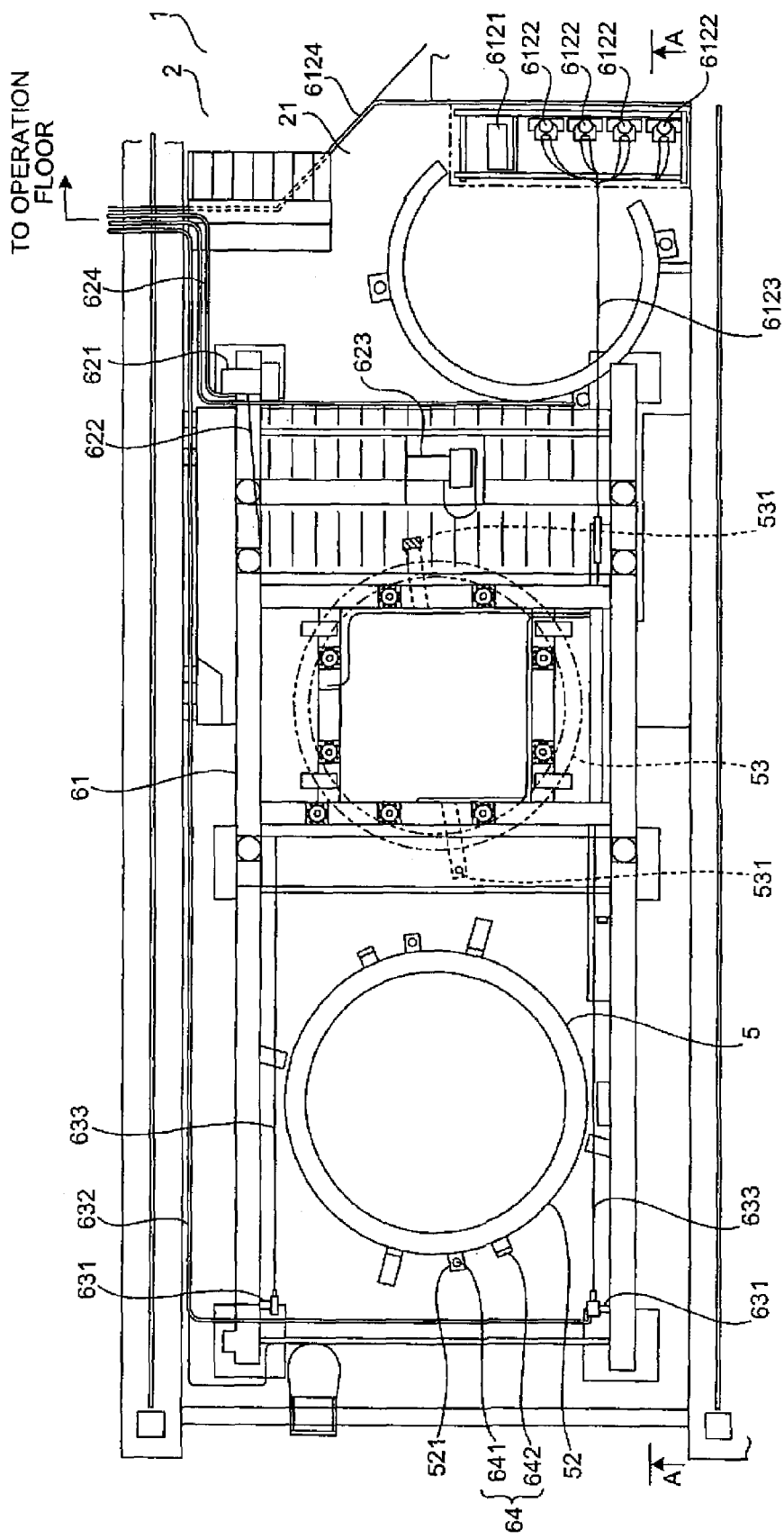
FIG. 1 is a schematic diagram of a nuclear reactor of a nuclear power plant.

1 Nuclear reactor
2 Operation floor
21 Cavity
3 Nuclear-reactor vessel
31 Target
32 Protection plate for nuclear-reactor vessel
4 Core structure
5 Storage container
51 Upper cover of storage-container
52 Storage-container body
521 Guide bush
524 Compensating shield
525 Chain block
53 Bottom cover of storage-container
531 Guide pin
532 Guide hole for positioning bottom-cover
536 Bolts for attaching bottom-cover
61 Moving device
611 Guide pin for positioning bottom-cover
612 Jack
6121 Hydraulic-pump control panel
6122 Hydraulic pump
6123 Hydraulic hose
6124 Cable
613 Free bearing
62 Moving operation device
621 Winch
622 Wire
623 Emergency winch
624 Cable
625 Remote monitoring camera
631 Detecting unit
632 Cable
633 Wire
64 Auxiliary device
641 First monitoring camera
642 Second monitoring camera
643 Camera protection plate
65 Carriage rail
66 Greenhouse
67 Local discharging device
7 Shielding plate for nuclear-reactor vessel

BEST MODE(S) FOR CARRYING OUT THE INVENTION

Exemplary embodiments of the present invention are described below in detail with reference to the accompanying drawings. The embodiments should not be interpreted so as to limit the present invention. The components of the embodiments include components that can be replaced easily by those skilled in the art and components substantially same as those of the embodiments. The modifications disclosed in the embodiment can be arbitrarily combined within the scope of those skilled in the art.

Embodiment

FIGS. 1 to 6 are schematic diagrams of a nuclear reactor of a nuclear power plant. FIGS. 7 to 24 are explanatory diagrams for explaining a core-structure storing method according to an embodiment of the present invention.

[Configuration of Nuclear Reactor and Core-Structure Storing Method]

A nuclear reactor 1 includes a nuclear-reactor containment whose outer surface is covered with an exterior shielding wall. An operation floor 2 is formed inside the nuclear-reactor containment (see FIGS. 1 and 2). A cavity 21 is formed inside the operation floor 2. A nuclear-reactor vessel 3 is positioned at the bottom of the cavity 21. A core structure (used core structure) 4 is placed inside the nuclear-reactor vessel 3. The used core structure 4 needs to be replaced from time to time.

The core structure 4 includes, for example, an upper core structure and a lower core structure. The core structure 4 is lifted up with a crane (not shown) from the upper side of the cavity 21, and then the lifted core structure 4 is put inside a storage container 5. The storage container 5 includes an upper cover 51, a storage-container body 52, and a bottom cover 53. The upper cover 51 and the bottom cover 53 are substantially circular, and the storage-container body 52 is substantially cylindrical. The upper cover 51 is attached to an upper portion of the storage-container body 52 while the bottom cover 53 is attached to a bottom portion of the storage-container body 52.

Water in the cavity 21 is drained out before putting the core structure 4 in the cavity 21. Next, the upper cover 51 is craned down and put on the core structure 4 in the nuclear-reactor vessel 3, and then the upper cover 51 is fixed to the core structure 4. The storage-container body 52 positioned above the nuclear-reactor vessel 3 is then craned down, so that the bottom of the storage-container body 52 is closely in contact with the upper surface of the nuclear-reactor vessel 3. The core structure 4 and the upper cover 51 are craned up to the inside of the storage-container body 52, and then, the upper cover 51 is attached to the storage-container body 52. The storage-container body 52 is craned up to a certain height, and then, the bottom cover 53 is positioned under the storage-container body 52. Then, the bottom cover 53 is attached to the storage-container body 52. In this manner, the core structure 4 is stored in the storage container 5. Thereafter, the storage container 5, containing the core structure 4, is carried outside the nuclear reactor 1.

[Attachment Structure of Bottom Cover]

Figure 3:
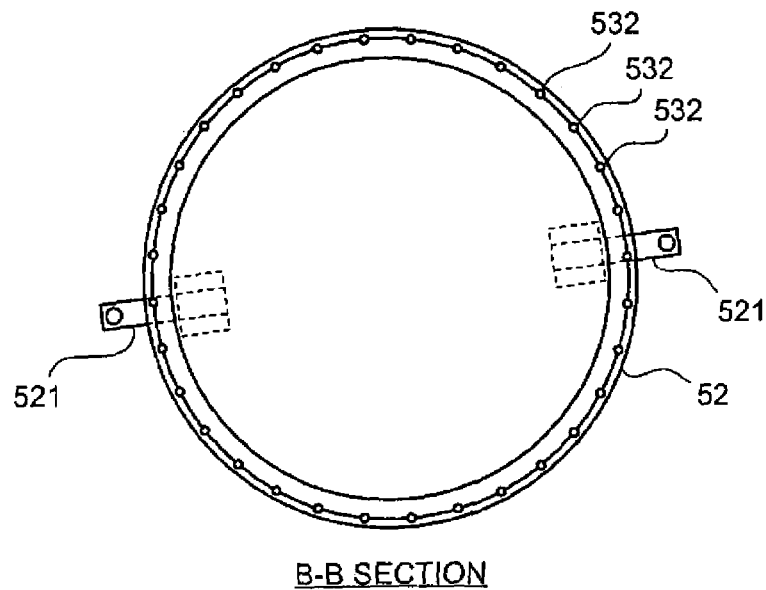
FIG. 3 is still another schematic diagram of a nuclear reactor of a nuclear power plant.
Figure 6:
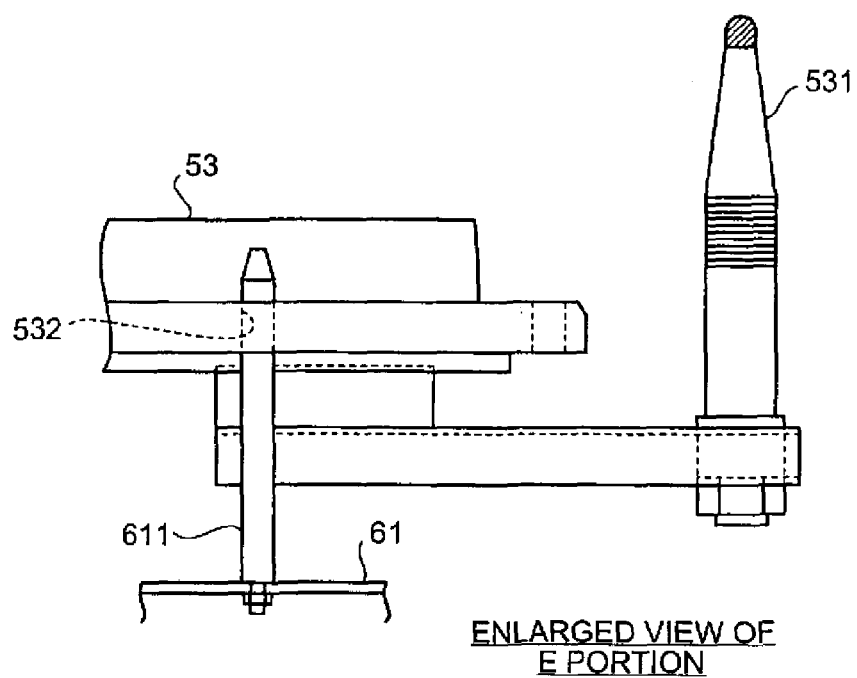
FIG. 6 is still another schematic diagram of a nuclear reactor of a nuclear power plant.

A plurality of (for example, two) guide pins 531 is provided to the bottom cover 53 of the storage container 5 (see FIGS. 3 and 6). The guide pins 531 are provided to the outer surface of the outer periphery of the bottom cover 53, and each have a tip facing upward (toward the storage-container body 52 during attachment of the bottom cover 53). The guide pins 531 have a tapered shape, i.e., the diameter thereof gradually decreases toward the tip, and the body of the guide pin 531 is cylindrical.

Figure 4:
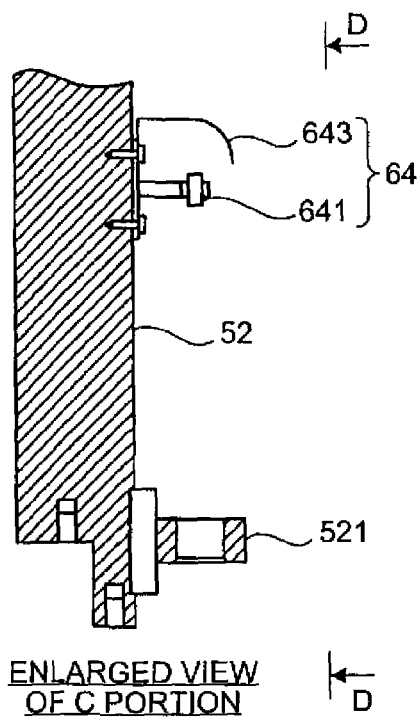
FIG. 4 is still another schematic diagram of a nuclear reactor of a nuclear power plant.
Figure 5:
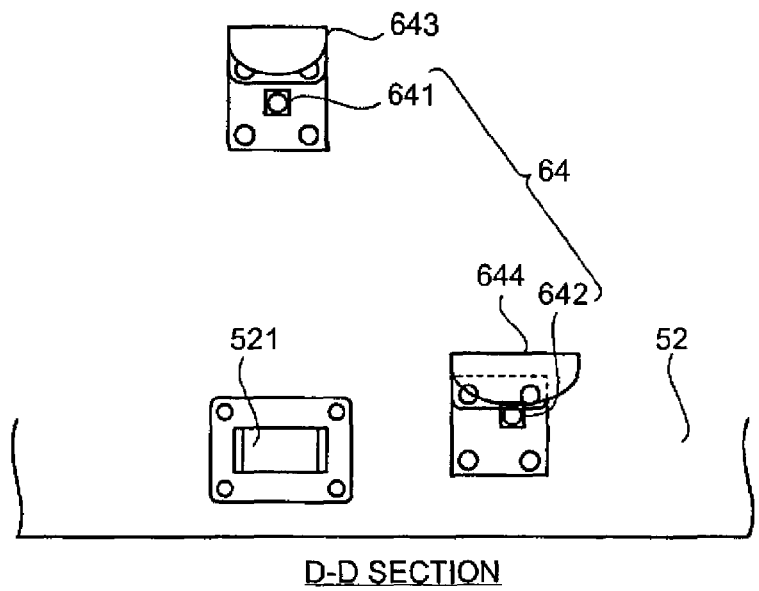
FIG. 5 is still another schematic diagram of a nuclear reactor of a nuclear power plant.

On the other hand, the storage-container body 52 is provided with guide bushes 521 such that the guide bushes 521 correspond to the guide pins 531, respectively (see FIGS. 4 and 5). The guide bushes 521 protrude from the side surface of the storage-container body 52. The guide bushes 521 each have a hole into which a corresponding guide pin 531 is inserted, so that the guide pins 531 fit respectively into the guide bushes 521.

During the attachment of the bottom cover 53 to the storage-container body 52, the bottom cover 53 and the storage-container body 52 are positioned by inserting the guide pins 531 into the guide bushes 521. Once the bottom cover 53 and the storage-container body 52 are positioned, the bottom cover 53 and the storage-container body 52 are fixed with bolts 536 (see FIG. 21).

The tips of the guide pins 531 are painted yellow. This makes it easier to see the tips of the guide pins 531 during the positioning of the bottom cover 53 with respect to the storage-container body 52. Marking (gap-checking scale) including a plurality of grooves and numerical marks is formed on the body of each of the guide pins 531. The marking helps checking how much the guide pins 531 are inserted into the guide bushes 521 during the positioning. On the other hand, the guide bushes 521 are painted yellow and red. Yellow and red paint helps determination on the allowable range of positional change of the guide bushes 521 with respect to the guide pins 531 during the remote monitoring.

[Unit for Attachment of Bottom Cover]

Figure 2:
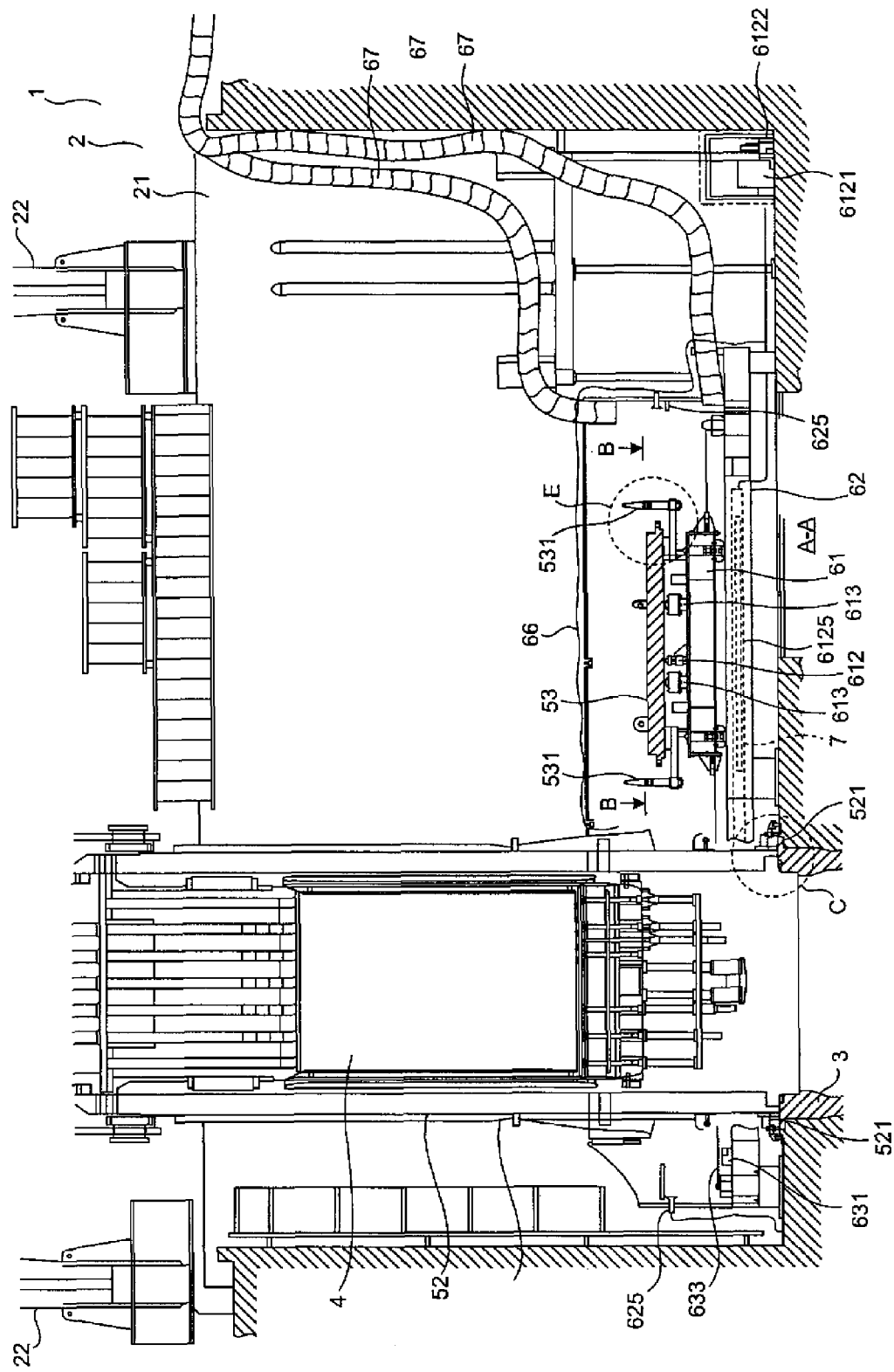
FIG. 2 is another schematic diagram of a nuclear reactor of a nuclear power plant.

A bottom-cover attaching device is used in the process of attaching the bottom cover 53 to the storage-container body 52 (see FIGS. 1 and 2). The bottom-cover attaching device includes the moving device 61, a moving operation device 62, a position checking device, and a position-determination auxiliary device 64.

The moving device 61 is a carrier (trolley) for carrying the bottom cover 53 (see FIGS. 1 and 2). The moving device 61 is craned down by a polar crane (not shown) into the cavity 21, and the moving device 61 is then placed on a carriage rail set in the cavity 21. The moving device 61 moves on a carriage rail 65 to be positioned under the storage container 5 that is hanging.

A plurality of jacks 612 is provided on the top of the moving device 61 (see FIGS. 2 and 11). The jacks 612 supports the storage-container bottom cover horizontally during movement of the moving device 61 or attachment of the bottom cover 53, and is elevated or lowered so that the bottom cover 53 can move vertically. The jacks 612 are, for example, hydraulic jacks, and are connected to hydraulic pumps 6122 and a hydraulic-pump control panel 6121 via a hydraulic hose 6123. An operation pendant of the jacks 612 (not shown) is set in a remote operation floor, and is connected to the hydraulic-pump control panel 6121 via a cable 6124. Such a configuration allows driving operation of the jacks 612 from the remote operation floor. The hydraulic hose 6123 is supported by a cable bearing (energy chain) 6125 near the moving device 61. This prevents the hydraulic hose 6123 from tangling when the moving device 61 moves. If it is necessary to arrange the hydraulic-pump control panel 6121 and the hydraulic pumps 6122 are in a highly-radioactive area due to arrangement of the components of the nuclear-power plant, the above components are protected with, for example, a lead plate.

A plurality of free bearings 613 is provided on the top of the moving device 61 (see FIGS. 2 and 11). The free bearings 613 and the jacks 612 are arranged on the same surface of the moving device 61. The free bearings 613 support the bottom cover 53 horizontally instead of the jacks 612 after the jacks 612 are lowered. The bottom cover 53 can move horizontally slightly on the moving device 61 (free bearings 613) in a state where the free bearings 613 support the bottom cover 53.

The moving operation device 62 includes a winch 621 (see FIGS. 1 and 2). The winch 621 is provided in the cavity 21. The winch 621 winds up a wire 622, which is stretched across the moving device 61, to pull the moving device 61. The operation pendant (not shown) of the winch 621 is provided in the remote operation floor, and is connected to the winch 621 via a cable 624. The winch 621 of the moving operation device 62 is driven to pull the moving device 61 with the wire 622, so that the moving device 61 moves on the carriage rail 65. The moving device 61 is remotely monitored in the remote operation floor, using a plurality of remote monitoring cameras 625 arranged in the cavity 21. Such a configuration allows remotely operating the moving device 61. In addition to the winch 621, an emergency winch 623 is set in the cavity 21.

The position checking device includes, for example, a detecting unit 631, an operation unit (not shown), and a display unit (not shown) (see FIGS. 1 and 2). The detecting unit 631 is, for example, a linear encoder and is disposed on the carriage rail 65. The operation unit and the display unit include, for example, a personal computer (PC) and a monitor thereof. The operation unit and the display unit are arranged in the remote operation floor and connected to the detecting unit 631 via a cable 632. The detecting unit 631 of the position checking device detects the amount of the positional change of the wire 633. Based on the detected amount, the operation unit calculates the position of the moving device 61, and the calculated position is displayed on the monitor. Hence, an operator can remotely check the position of the moving device 61 in the cavity 21 (on the monitor at the operation floor).

The position-determination auxiliary device 64 includes first monitoring cameras 641 and second monitoring cameras 642 (see FIGS. 4 and 5). The first monitoring camera 641 monitors the positional relationship between the guide bush 521 and the guide pin 531 from a vertical direction, and is provided to the side surface of the storage-container body 52 above the guide bush 521. The second monitoring camera 642 monitor the positional relationship between the guide bush 521 and the guide pin 531 from a horizontal direction, and is provided to the side surface of the storage-container body 52 beside the guide bush 521. The first monitoring camera 641 and the second monitoring camera 642 of the position-determination auxiliary device 64 record images which represent the positional relationship between the guide bush 521 and the guide pin 531 during attachment of the bottom cover 53. The information about the recorded images is transmitted to the operation floor. Thus, the storage-container body 52 and the bottom cover 53 can be positioned while an operator at the remote operation floor checks the positional relationship between the guide bush 521 and the guide pin 531. Above each of the first monitoring cameras 641, a camera protection plate 643 is provided. Above each of the second monitoring cameras 642, a camera protection plate 644 is provided. The camera protection plates 643 and the camera protection plates 644 each have a function of preventing a plastic sheet of a greenhouse 66 from directly covering lenses of the monitoring cameras 641 and 642. In addition, the camera protection plates 643 and 644 each have a function of inhibiting the monitoring cameras 641 and 642 from changing the direction for monitoring due to the plastic sheet and protecting the monitoring cameras 641 and 642 from being damaged due to the weight of the plastic sheet.

A framework is constructed in the cavity 21 to form the greenhouse 66. The greenhouse 66 includes the plastic sheet, and covers over the storage container 5 and the carriage rail 65 (therefore, radioactive dust is prevented from scattering from the cavity 21 to the operation floor). The air in the greenhouse 66 is discharged by a local discharging device 67 provided in the cavity 21. The local discharging device 67 includes a removing device (not shown) for removing a radioactive substance in the air. The local discharging device 67 prevents the radioactive substance from scattering and leaking during attachment of the bottom cover 53.

[Method of Attaching Storage-Container Bottom Cover]

Figure 7:
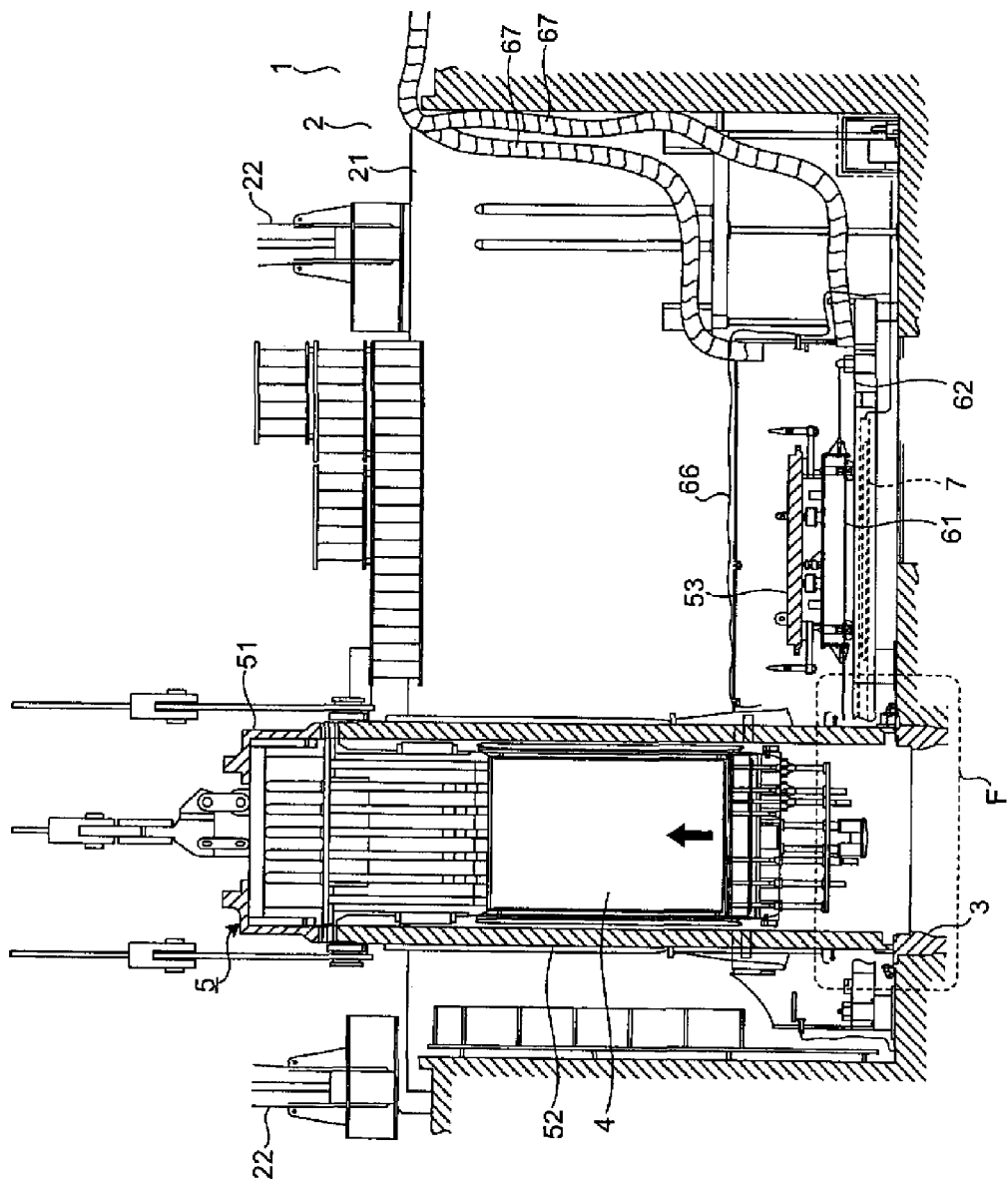
FIG. 7 is an explanatory diagram for explaining a core-structure storing method according to an embodiment of the present invention.

Prior to the process of attaching the bottom cover 53, the moving device 61 is placed on the carriage rail 65 in the cavity 21 (see FIG. 7). A shielding plate 7 for shielding the nuclear-reactor vessel 3 is previously hung from the moving device 61 outside the nuclear reactor. The nuclear-reactor vessel shielding plate 7 is used to close the opening of the nuclear-reactor vessel 3 while an operator is working inside the cavity 21, thereby reducing the leakage of the radioactive substance from the nuclear-reactor vessel 3.

The bottom cover 53 is craned down into the cavity 21 and placed on the moving device 61 (see FIG. 7). In the bottom surface of the bottom cover 53, a plurality of guide holes 532 for positioning the bottom-cover 53 is provided along the circumference of the bottom cover 53 (see FIG. 3). On the top surface of the moving device 61, a plurality of guide pins 611 for positioning the bottom-cover 53 is provided at positions corresponding to the guide holes 532, respectively (see FIG. 6). The guide pins 611 are inserted respectively into the guide holes 532, so that the bottom cover 53 is placed at a certain position on the moving device 61.

Figure 8:
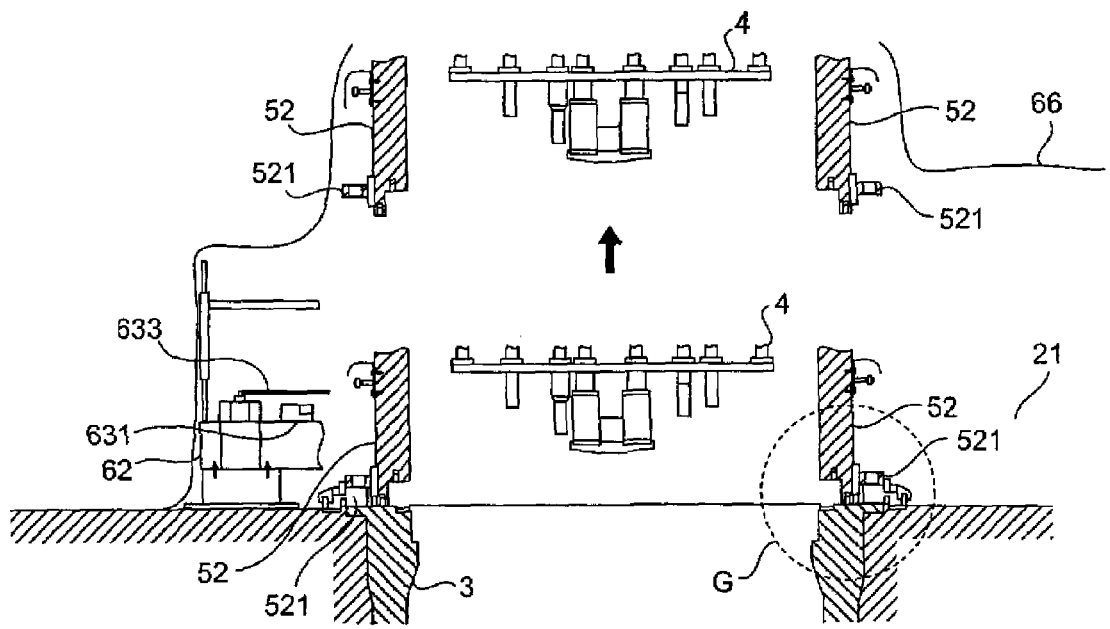
FIG. 8 is another explanatory diagram for explaining the core-structure storing method.
Figure 9:
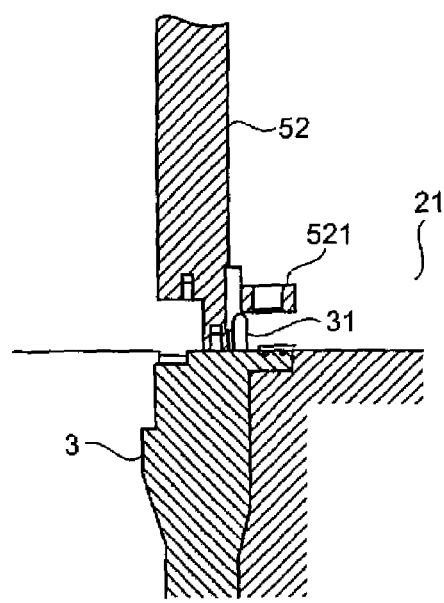
FIG. 9 is still another explanatory diagram for explaining the core-structure storing method.

The storage-container body 52 is craned down toward the nuclear-reactor vessel 3, and the bottom surface of the storage-container body 52 (the surface of the bottom opening portion to be attached) comes closely in contact with the top surface (the flange surface) of the nuclear-reactor vessel 3 (see FIGS. 8 and 9). On the top surface of the nuclear-reactor vessel 3, targets 31 for attachment of the storage-container body 52 are provided (see FIG. 9). On the inner periphery of the flange of the nuclear-reactor vessel 3, protection plates 32 for protecting the nuclear-reactor vessel 3 are provided.

In the process of attachment of the bottom cover 53, first, a chain jack (not shown) winds up the chains to crane up the storage-container body 52 by a few meters (see FIGS. 7 and 8). Accordingly, a space is formed below the storage-container body 52, in which the bottom cover 53 (and the moving device 61) is placed.

Figure 10:
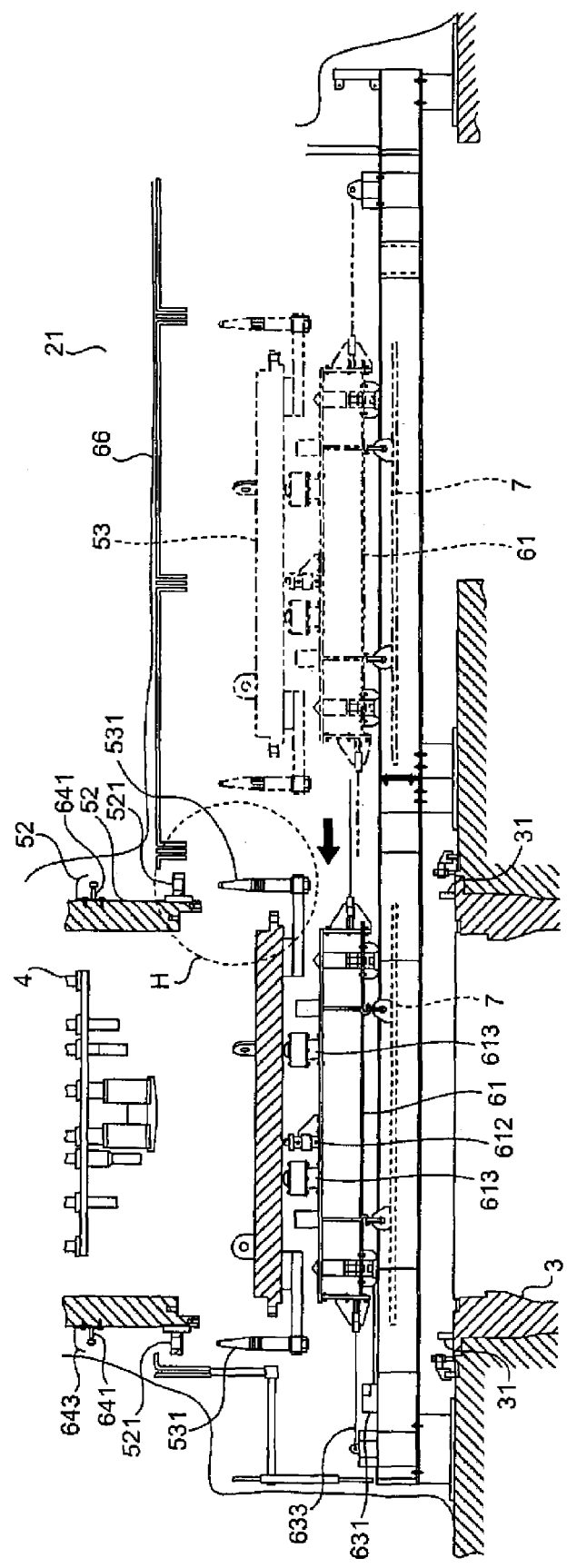
FIG. 10 is still another explanatory diagram for explaining the core-structure storing method.

The moving device 61 is moved horizontally on the carriage rail 65, and thus positioned below the storage-container body 52 (above the nuclear-reactor vessel 3) (see FIGS. 10 and 11). As illustrated in FIG. 11, the storage-container body 52 includes a vertical protruding portion 1101 that protrudes from its bottom. The moving device 61 is moved by using the moving operation device 62 and the position checking device 63 while an operator at the remote operation floor checks the position of the moving device 61. On the moving device 61 that is moving, the bottom cover 53 is supported by the jacks 612 (see FIG. 11). This prevents the bottom cover 53 from sliding on the free bearings 613 while the moving device 61 is being moved. The bottom cover 53 includes a horizontal protruding portion 1102 that protrudes from the circumference portion of the bottom cover 53.

Figure 12:
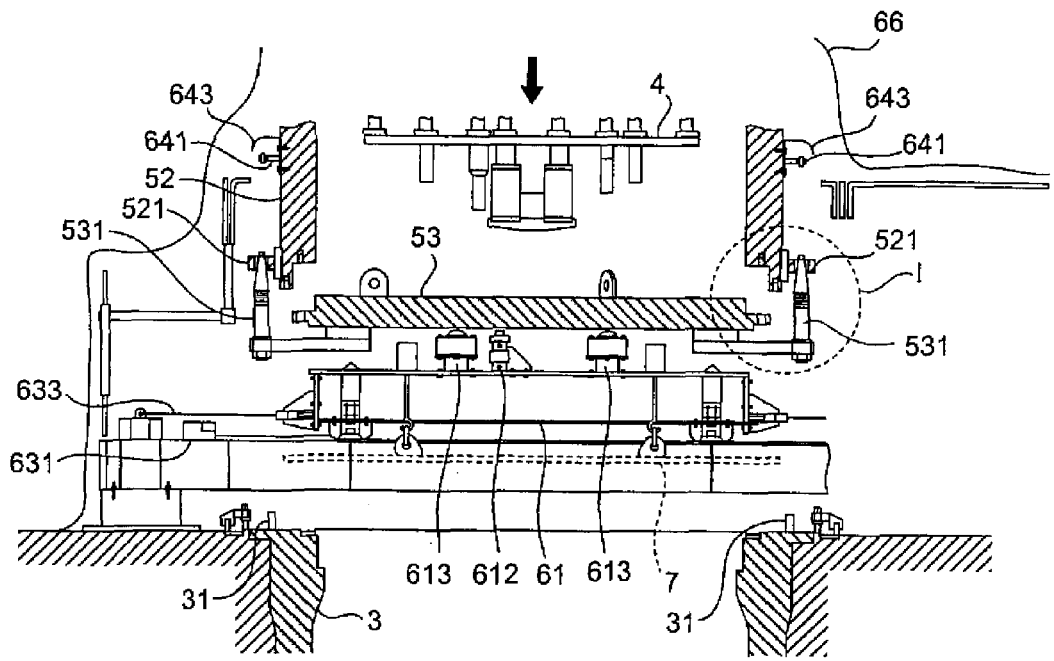
FIG. 12 is still another explanatory diagram for explaining the core-structure storing method.

Subsequently, the storage-container body 52 and the bottom cover 53 are positioned horizontally (the position of the guide bushes 521 with respect to the guide pins 531 are adjusted) (see FIG. 12). Specifically, while the first monitoring camera 641 monitors the horizontal positional relationship between the guide pin 531 and the guide bush 521 from the vertical direction, the tip of the guide pin 531 is inserted into the guide bush 521. When the positions of the guide pin 531 and the guide bush 521 are not correctly positioned, a jack at a temporary craning equipment (craning structure) 22 is operated to horizontally moves and rotate the storage-container body 52. In this manner, the positions are adjusted. After the positioning, the chain jack (not shown) unwinds the chains to crane down the storage-container body 52.

Figure 13:
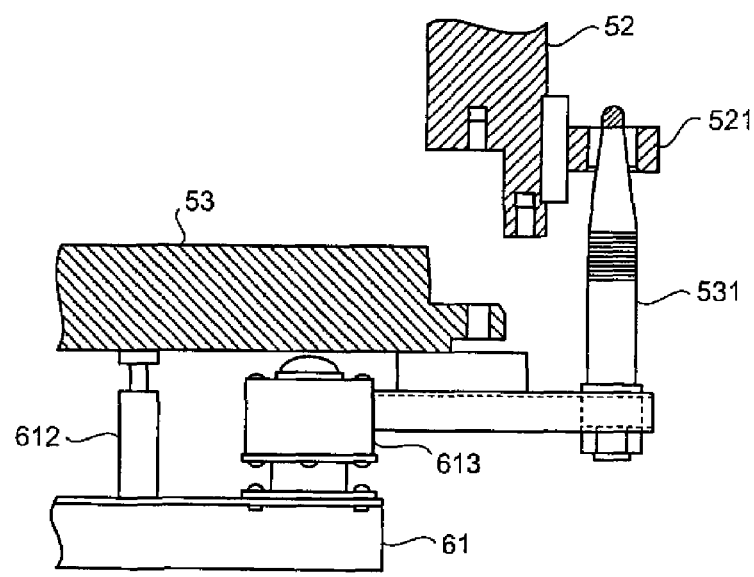
FIG. 13 is still another explanatory diagram for explaining the core-structure storing method.

After the tip of the guide bush 521 protrudes from the top edge of the guide pin 531 (penetrates through the hole), the craning down of the storage-container body 52 is stopped (see FIG. 13). At this stage, clearance is present between the tip of the guide pin 531 and the inner periphery of the guide bush 521 having the hole, because the tip of the guide pin 531 is tapered. In a range where the clearance allows, the position of the bottom cover 53 can be changed horizontally slightly with respect to the storage-container body 52.

Figure 14:
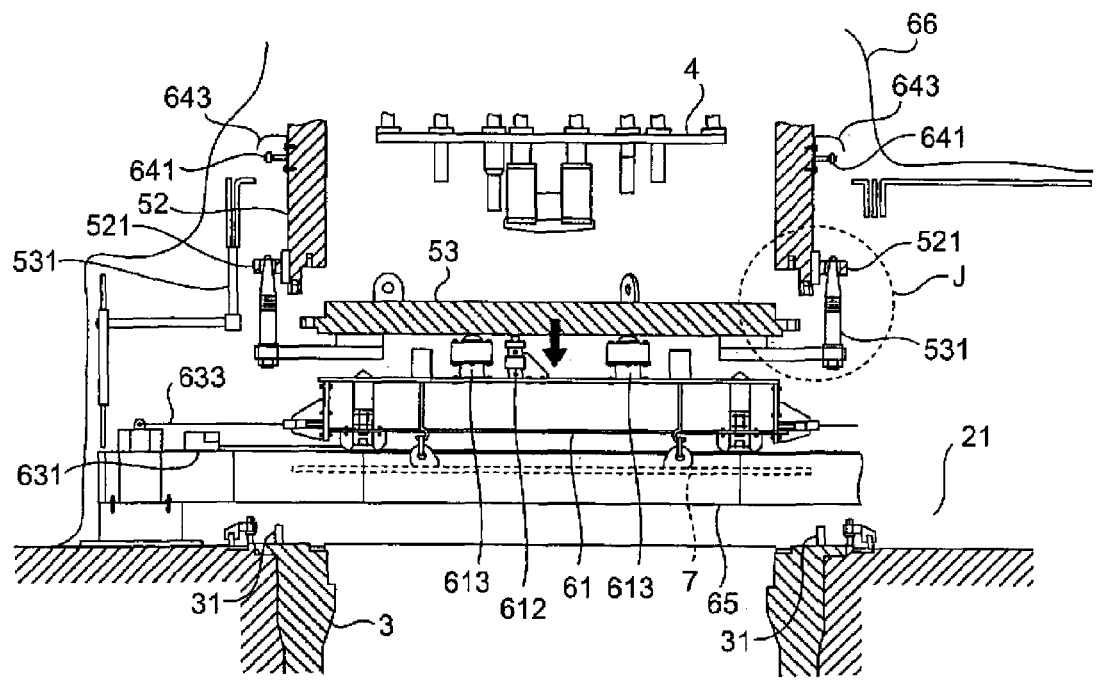
FIG. 14 is still another explanatory diagram for explaining the core-structure storing method.
Figure 15:
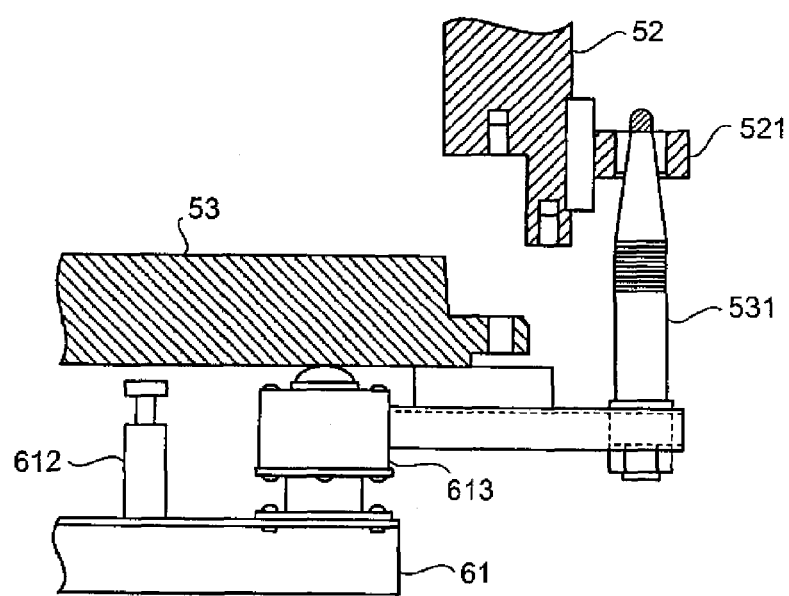
FIG. 15 is still another explanatory diagram for explaining the core-structure storing method.

The jacks 612 of the moving device 61 are lowered to the lowest position to place the bottom cover 53 on the free bearings 613 (see FIGS. 14 and 15). Accordingly, the entire load of the bottom cover 53 is put on the free bearings 613, and thus, the position of the bottom cover 53 can be changed horizontally slightly on the moving device 61 by rolling the free bearings 613. Because the tips of the guide pins 531 penetrate through the guide bushes 521, the storage-container body 52 and the bottom cover 53 are positioned horizontally within a predetermined range.

The craning down of the storage-container body 52 is restarted and the storage-container body 52 is lowered, so that the guide bushes 521 comes in contact with the bodies of the guide pins 531. Accordingly, an external force corresponding to the shape of the tip of the guide pin 531 (tapered shape) is put on the guide bush 521. Because the free bearings 613 support the bottom cover 53, the external force smoothly changes the position of the bottom cover 53 horizontally slightly along the shapes of the tip portion of the guide pins 531. In this manner, the storage-container body 52 and the bottom cover 53 can be positioned horizontally smoothly.

Figure 16:
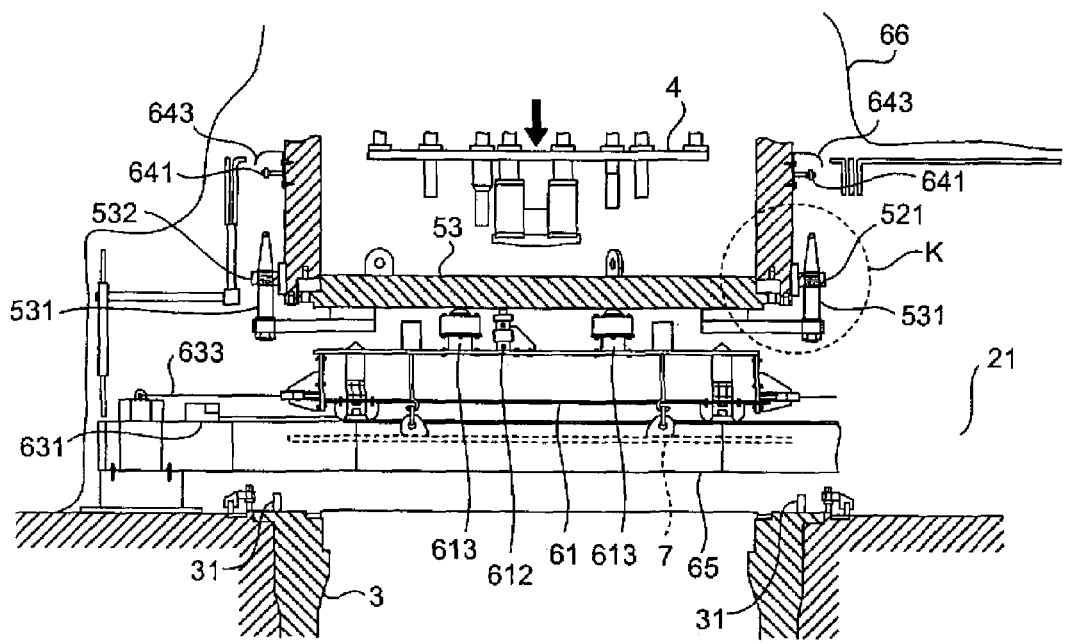
FIG. 16 is still another explanatory diagram for explaining the core-structure storing method.
Figure 17:
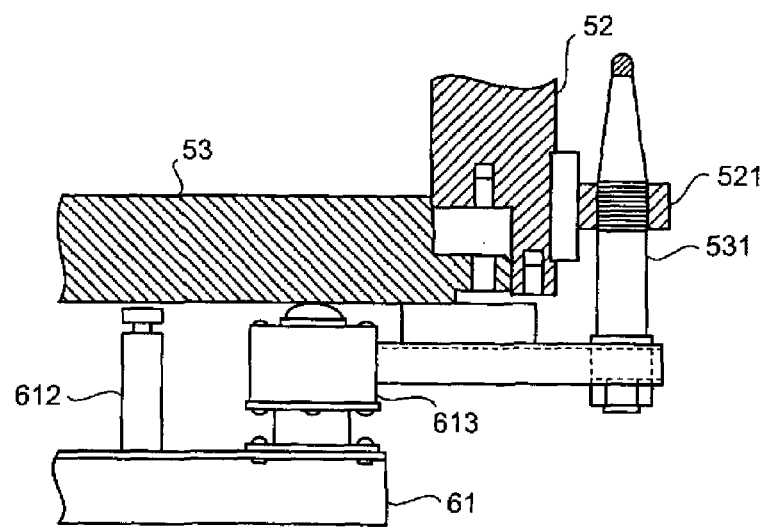
FIG. 17 is still another explanatory diagram for explaining the core-structure storing method.

When the clearance (vertical distance) between the connecting portion of the storage-container body 52 and the connecting portion of the bottom cover 53 (flange) reaches a certain amount, the craning down of the storage-container body 52 is stopped (see FIGS. 16 and 17). The second monitoring camera 642 monitors the vertical positional relationship between the guide pin 531 and the guide bush 521 from the horizontal direction. Specifically, the position of the guide bush 521 with respect to the marking of the body of the guide pin 53 is monitored. Based on the monitoring result, the remote operation is performed for the positioning of the storage-container body 52 in the vertical direction.

Figure 18:
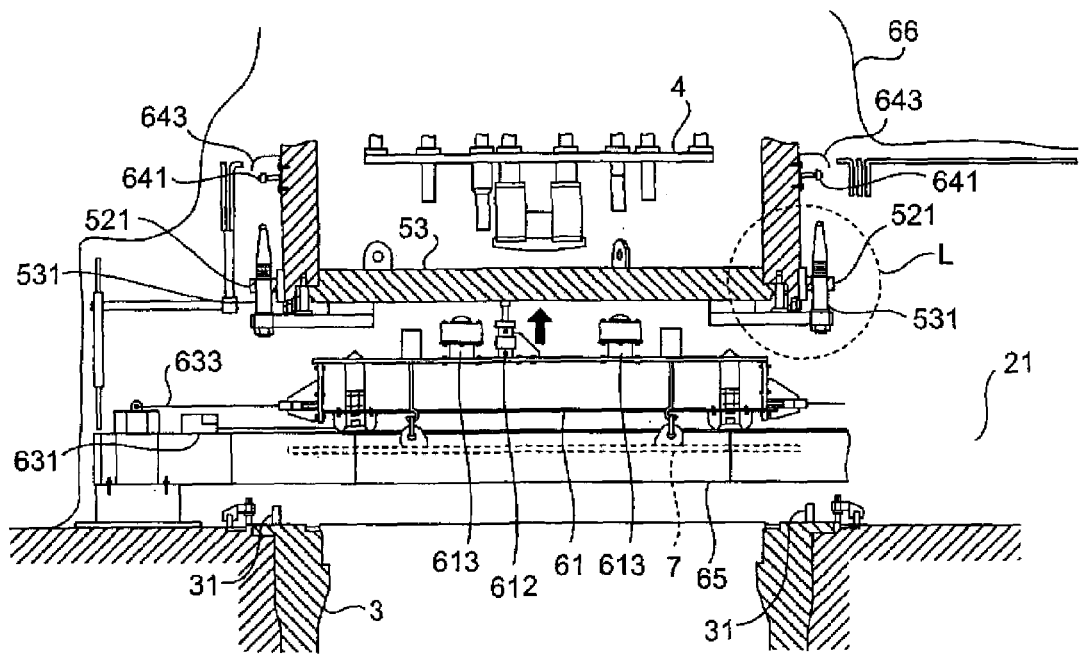
FIG. 18 is still another explanatory diagram for explaining the core-structure storing method.
Figure 19:
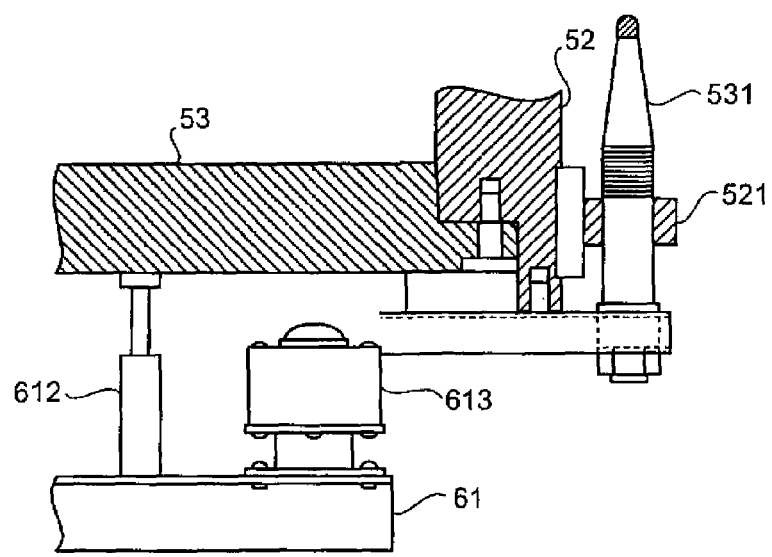
FIG. 19 is still another explanatory diagram for explaining the core-structure storing method.
Figure 20:
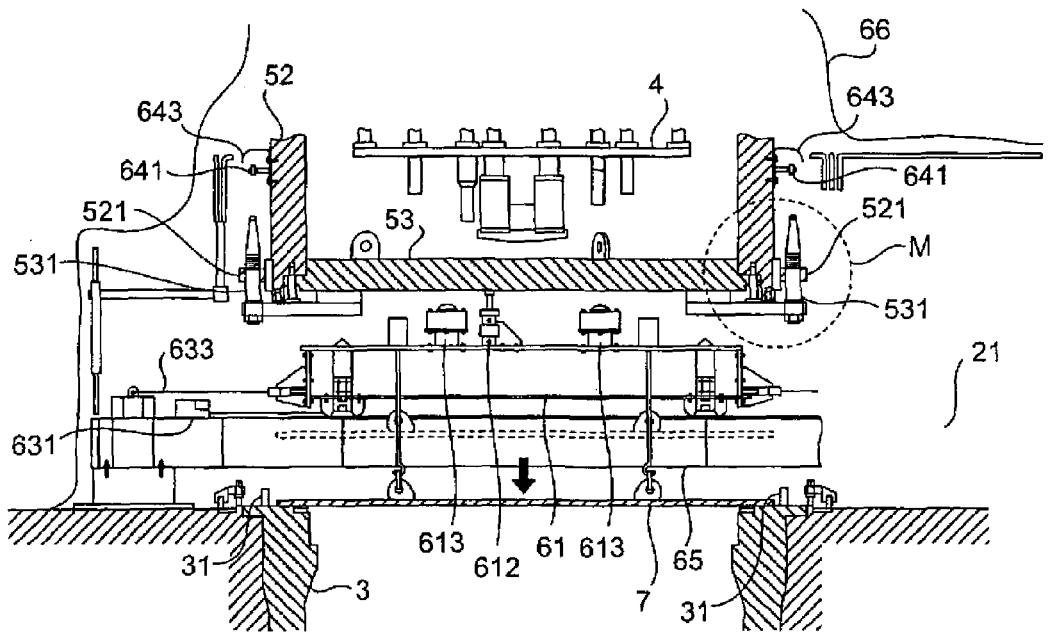
FIG. 20 is still another explanatory diagram for explaining the core-structure storing method.
Figure 21:
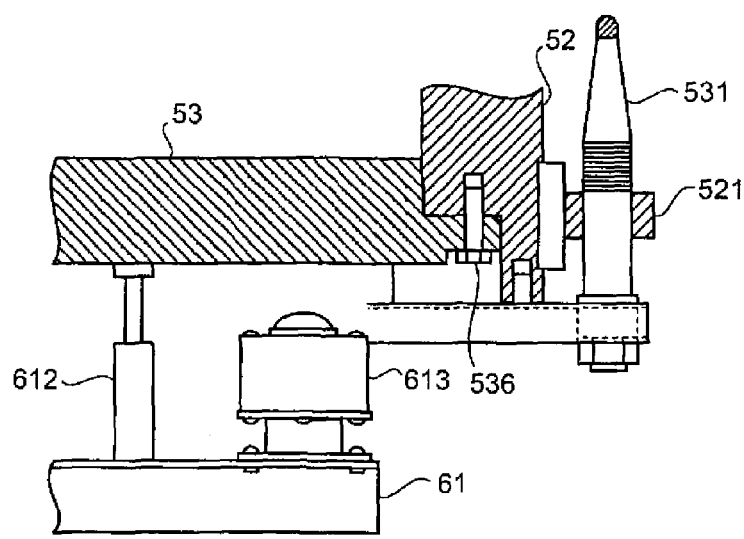
FIG. 21 is still another explanatory diagram for explaining the core-structure storing method.

The jacks 612 are elevated to elevate the bottom cover 53 (see FIGS. 18 and 19). After the bottom cover 53 is elevated to the position distant from the storage-container body 52 by a certain distance (for example, 5 millimeter), the jacking up is suspended. In this case, the bottom cover 53 is being elevated while the second monitoring camera 642 monitors the vertical positional relationship between the marking of the guide pin 531 and the guide bush 521 from the horizontal direction. Therefore, depending on the monitoring, the jacks 612 of the moving device 61 are remotely operated, and whereby the positional relationship between the bottom cover 53 and the storage-container body 52 are adjusted.

The jacks 612 are inched up while the marking of the guide pins 531 is checked until the storage-container body 52 and the bottom cover 53 are closely in contact with each other. When the bottom cover 53 is closely in contact with the storage-container body 52, the jacking up is stopped. The pendant switch of the jacks 612 is provided with, in addition to a button for elevating and lowering the jacks 612, a button for stopping driving the jacks 612 when a pressure equal to or higher than a set pressure is detected. The buttons are used to operate the jacks 612 so that the storage-container body 52 and the bottom cover 53 are closely in contact with each other.

The radiation dose in the cavity 21 is measured and it is judged whether an operator can enter the cavity 21. When it is judged that the operator can enter the cavity 21, the shielding plate 7 is craned down from the bottom of the moving device 61 to close the opening of the nuclear-reactor vessel 3 (see FIG. 20). The operator operates a manual chain block, so that the shielding plate 7 is craned down. The shielding plate 7 reduces the leakage of the radioactive substance from the nuclear-reactor vessel 3, and thus, the operator who works in the cavity 21 can be further inhibited from being irradiated. The operator manually fixes the bottom cover 53 and the storage-container body 52 with the bottom-cover attaching bolts 536 (see FIG. 21).

Figure 22:
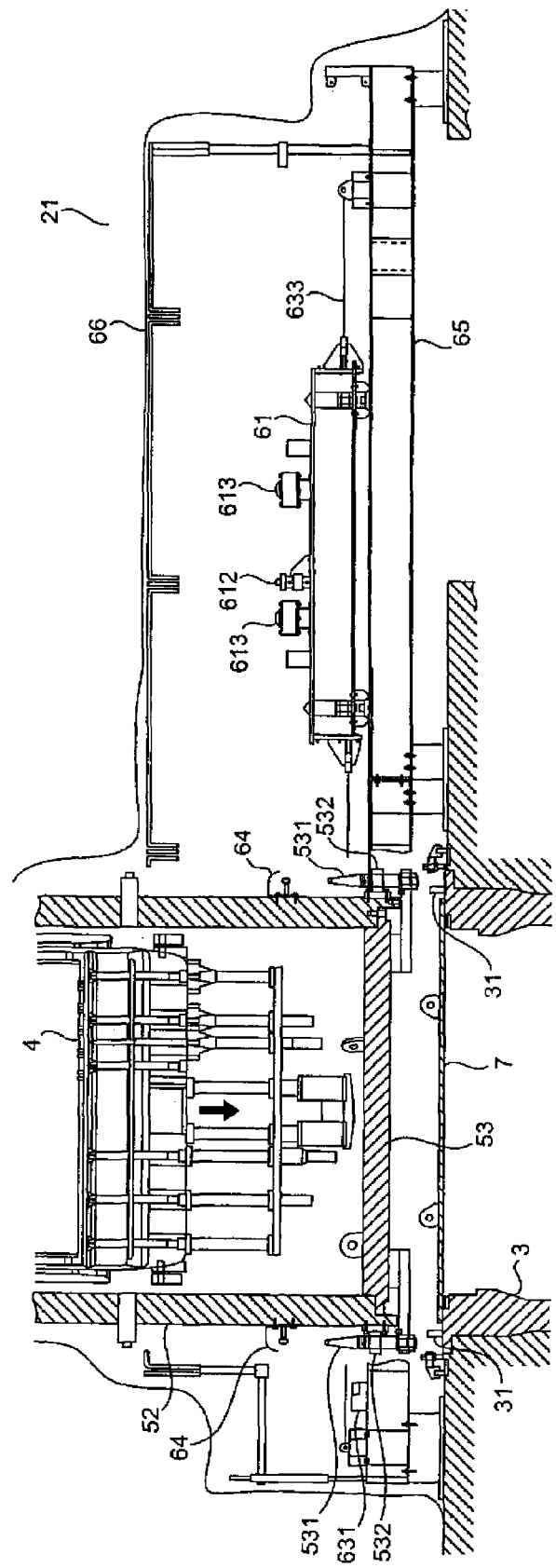
FIG. 22 is still another explanatory diagram for explaining the core-structure storing method.
Figure 23:
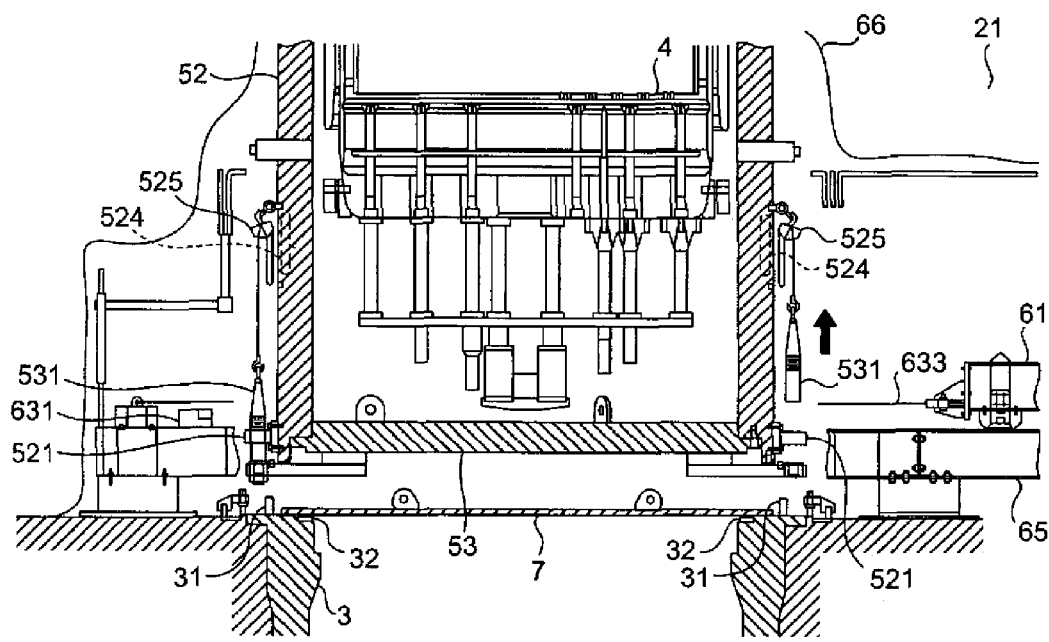
FIG. 23 is still another explanatory diagram for explaining the core-structure storing method.
Figure 24:
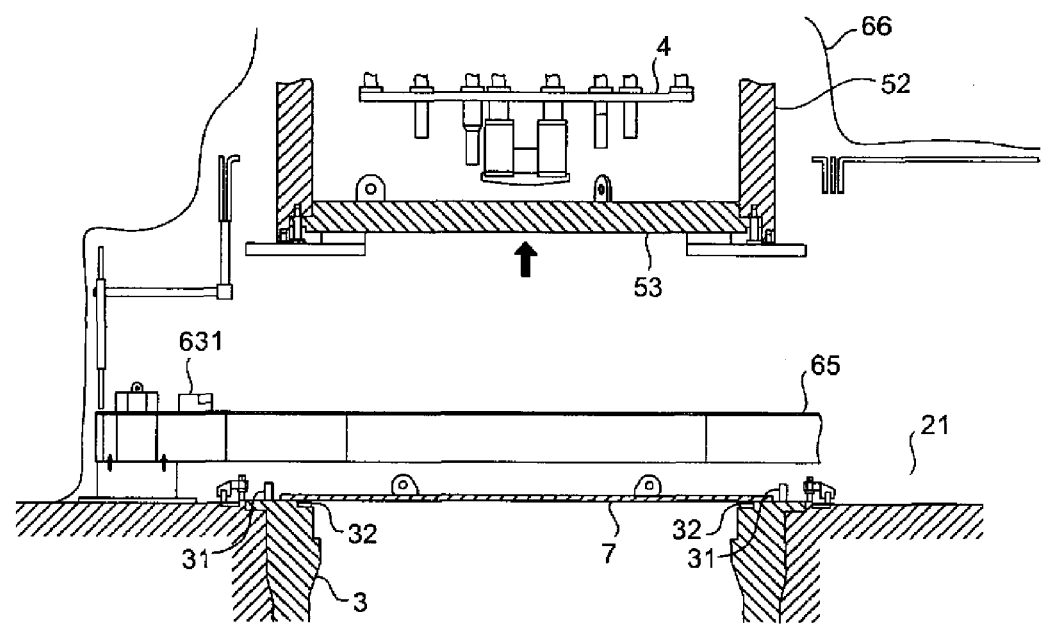
FIG. 24 is still another explanatory diagram for explaining the core-structure storing method.

The moving device 61 is moved on the carriage rail 65 toward the canal, so that the moving device 61 can be positioned at the original position (see FIG. 22). The chain jack unwound the chains, so that the storage container 5 (the storage-container body 52 and the bottom cover 53) is lowered and stopped at a certain position. Thereafter, the first monitoring cameras 641 above the guide pins 531 are detached, and an eye bolt and a chain block 525 are attached to a compensating shield 524 (see FIG. 23). The guide pins 531 are craned up by the chain blocks 525, so that the guide pins 531 are detached from the bottom cover 53. Similarly, the guide bushes 521 are detached from the storage-container body 52. The detachment operations are performed in the greenhouse 66. Hence, the dust is prevented from leaking outside.

Thereafter, the chain jack winds up the chains, and thus, the storage container 5 (see FIG. 24) is craned up. A temporary floor (not shown) is reconstructed and the bottom-cover attaching bolts 536 are firmly fastened, so that the storage-container body 52 and the bottom cover 53 are firmly fixed.

[Effect]

In the core-structure storing method, the storage-container body 52 and the bottom cover 53 are positioned in a way that the position of the bottom cover 53 is adjusted while being supported by the free beatings 613 on the moving device 61 (see FIGS. 14 and 15). In this method, the storage-container body 52 and the bottom cover 53 are positioned smoothly because the bottom cover 53 can be moved (moved horizontally) while the bottom cover 53 is supported by the free bearings 613. This advantageously facilitates the operation of the attachment of the bottom cover 53. Accordingly, the operation period is shortened, and this advantageously reduces irradiation on an operator.

Furthermore, in the core-structure storing method, the guide pins 531 and the guide bushes 521 are used for the positioning, and the storage-container body 52 and the bottom cover 53 are positioned in a way that the guide pins 531 are engaged with (inserted into) and guided by the guide bushes 521, respectively (see FIGS. 14 and 15). This advantageously facilitates the operation of attachment of the bottom cover 53. Specifically, the position of the bottom cover 53 is adjusted smoothly, because the guide pins 531 are engaged with the guide bushes 521 while the bottom cover 53 is supported by the free bearings 613. In this manner, the positioning is performed smoothly. This advantageously facilitates the operation of attachment of the bottom cover 53, and advantageously shortens the operation period, thus reducing irradiation of an operator.

In the above method, the guide pins 531 are attached to the bottom cover 53 and the guide bushes 521 are attached to the storage-container body 52. However, the structure is not limited to this, and alternatively, the guide bushes 521 can be attached to the bottom cover 53 and the guide pins 531 can be attached to the storage-container body 52.

In the core-structure storing method, the bottom cover 53 on the moving device 61 is pushed up to be attached tightly to the storage-container body 52. This method advantageously facilitates the repositioning (reattachment) in the case of an operational error, or the like, compared to the case where the storage-container body 52 that is heavier than the bottom cover 53 is craned down and attached to the bottom cover 53. Furthermore, the clearance between the bottom cover 53 and the storage-container body 52 can be made smaller than that in a case where the bottom cover 53 is craned up to be tightly attached to the storage-container body 52 (see Patent Document 1). This advantageously reduces the leakage of the radioactive substance from the storage container 5, thus reducing the irradiation of an operator. The bottom cover 53 is pushed up by the jacks 612 or an alternative lifting-up unit.

In the core-structure storing method, the bottom cover 53 is prevented from moving on the free beatings 613 while being carried because the bottom cover 53 is fixed on the moving device 61. This advantageously prevents an accident during the transfer of the bottom cover 53.

In the above method, it is preferable that as an elevating unit for elevating and lowering the bottom cover 53, for example, the jacks 612 be adopted. In the method, the jacks 612 are elevated during the carriage of the bottom cover 53, and are lowered (jacked down) during the positioning so that the bottom cover 53 is placed on the free bearings 613. During the attachment of the bottom cover, the jacks 612 are elevated (jacked up), so that the bottom cover 53 is tightly in contact with the storage-container body 52 (see FIGS. 10 to 19). This leads to an advantage that the bottom-cover attaching device can be configured with a simple configuration including the elevating unit (the jacks 612) and the free bearings 613. It is preferable that a winch (not shown) be additionally provided as a backup winch for emergency. This leads to an advantage that, in case the normally used winch malfunctions, the backup winch can be used, thus improving the operational environment.

In the core-structure storing method, because the moving operation device 62 for moving the moving device 61 is provided, an operator at the operation floor can move the moving device 61 while checking the position of the moving device 61. This advantageously further reduces irradiation on an operator.

In the core-structure storing method, because the position checking device for checking the position of the moving device 61 is provided, an operator at the operation floor can operate the moving device 61 while checking the position of the moving device 61. This advantageously reduces irradiation on an operator.

In the core-structure storing method, the position-determination auxiliary device 64 for checking the positions of the storage-container body 52 and the bottom cover 53 is provided. Hence, an operator at the operation floor can position the storage-container body 52 and the bottom cover 53 while checking the positional relationship between the guide bushes 521 and the guide pins 531. This advantageously reduces irradiation on an operator.

In the core-structure storing method, the jacks 612 that support the bottom cover 53 on the moving device 61 are provided, and an operator at the remote operation floor can remotely operate the jacks 612. This advantageously further reduces irradiation on an operator.

Industrial Applicability

As described above, the core-structure storing method according to the present invention is useful because this method can further inhibit an operator from being irradiated.

The invention claimed is:

1. A method of storing a core structure in a storage container after the storage container is carried into a reactor containment, said storage container having a vertical protruding portion protruding from the bottom of said storage container, the method comprising:
    carrying, by using a moving device which is movable, a bottom cover of the storage container to a body of the storage container, said bottom cover having a horizontal protruding portion protruding from a circumference portion of the bottom cover;
    positioning the body; positioning the bottom cover on the moving device by rolling a free bearing while the bottom cover is supported by the free bearing, the bottom cover being positioned in a horizontal direction such that the horizontal protruding portion closely fits into the vertical protruding portion, as a guide bush is descended along a tapered portion of a guide pin; and
    attaching the bottom cover to the body after said body is positioned.

2. The method according to claim 1, wherein the attaching includes attaching the bottom cover to the body tightly by pushing up the bottom cover on the moving device.

3. The method according to claim 2, wherein
    the carrying of the bottom cover includes fixing the bottom cover onto the moving device, and
    the positioning includes releasing the fixing of the bottom cover, so that the bottom cover is supported by the free bearing.

4. The method according to claim 1, wherein
    the carrying of the bottom cover includes fixing the bottom cover onto the moving device, and
    the positioning includes releasing the fixing of the bottom cover, so that the bottom cover is supported by the free bearing.

* * * * *